US010817248B2

(12) United States Patent
Xie

(10) Patent No.: US 10,817,248 B2
(45) Date of Patent: Oct. 27, 2020

(54) METHOD AND DEVICE FOR PROCESSING TEXT INFORMATION

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 166 days.

(21) Appl. No.: 15/728,010

(22) Filed: Oct. 9, 2017

(65) Prior Publication Data

US 2018/0113671 A1 Apr. 26, 2018

(30) Foreign Application Priority Data

Oct. 25, 2016 (CN) .......................... 2016 1 0936570

(51) Int. Cl.

| | |
|---|---|
| ***G10L 13/00*** | (2006.01) |
| ***G06F 3/16*** | (2006.01) |
| ***G06F 3/03*** | (2006.01) |
| ***G06F 3/01*** | (2006.01) |
| ***G06F 3/0483*** | (2013.01) |
| ***G06F 3/0488*** | (2013.01) |
| ***G06F 3/0489*** | (2013.01) |
| ***G10L 13/08*** | (2013.01) |

(52) U.S. Cl.

CPC .............. *G06F 3/165* (2013.01); *G06F 3/013* (2013.01); *G06F 3/0304* (2013.01); *G06F 3/0483* (2013.01); *G06F 3/0488* (2013.01); *G06F 3/0489* (2013.01); *G10L 13/08* (2013.01); *G06F 3/017* (2013.01); *G10L 13/00* (2013.01)

(58) Field of Classification Search

CPC ................................ G06F 3/165; G10L 13/00

See application file for complete search history.

(56) References Cited

U.S. PATENT DOCUMENTS

2012/0272179 A1* 10/2012 Stafford .................. G06F 3/038 715/781
2013/0083003 A1* 4/2013 Perez ...................... G06F 3/005 345/419
2013/0279706 A1* 10/2013 Marti ...................... G06F 3/165 381/57

(Continued)

FOREIGN PATENT DOCUMENTS

CN 101969509 A 2/2011
CN 103870097 A 6/2014
CN 104731476 A 6/2015

OTHER PUBLICATIONS

Office action from EPO for EP application 17191741, dated Mar. 12, 2018; 12 pages.

(Continued)

*Primary Examiner* — Michael N Opsasnick
(74) *Attorney, Agent, or Firm* — Arch & Lake LLP

(57) ABSTRACT

The present disclosure provides a method, an apparatus and a non-transitory computer-readable storage medium for processing text information. The method includes: determining that first text information is in a browsed state; when it is determined that the browsed state is interrupted, obtaining second text information from the first text information; converting the second text information to speech information and playing the speech information.

20 Claims, 10 Drawing Sheets

(56) References Cited

U.S. PATENT DOCUMENTS

2014/0168056 A1* 6/2014 Swaminathan ......... G06F 3/013
345/156
2014/0334666 A1* 11/2014 Lankford ................ G06F 3/013
382/103
2015/0149179 A1* 5/2015 Korbecki ................ G10L 13/00
704/260
2015/0286873 A1* 10/2015 Davis ........................ G06F 3/00
382/103
2016/0059775 A1* 3/2016 Gorse ..................... G01S 19/13
701/468
2016/0070342 A1* 3/2016 Taylor ..................... G06F 3/017
715/727
2016/0205238 A1* 7/2016 Abramson ......... G01C 21/3641
455/456.4
2016/0224308 A1* 8/2016 Pierce ..................... G06F 3/165
2016/0275952 A1* 9/2016 Kashtan .................. G10L 17/00
2017/0130967 A1* 5/2017 Weaver, Jr. ......... F24C 15/2007

OTHER PUBLICATIONS

First Office Action corresponding to Chinese Application No. 201610936570.0, dated Sep. 27, 2018, and English translation (22p).

* cited by examiner

METHOD AND DEVICE FOR PROCESSING TEXT INFORMATION

CROSS-REFERENCE TO RELATED APPLICATION

This application is based on and claims priority to the Chinese Patent Application Serial No. 201610936570.0, filed with the State Intellectual Property Office of P. R. China on Oct. 25, 2016, the entire contents of which are incorporated herein by reference.

FIELD

The present disclosure relates to the field of terminal technology, and more particularly, to a method, an apparatus and a non-transitory computer-readable storage medium for processing text information.

BACKGROUND

With the development of terminal technology, a terminal may support a number of applications, and functions of the terminal may expand. A user may install a browser on the terminal and browse web pages through the browser. The user may also install an e-book reader on the terminal and read e-books through the e-book reader.

However, when the user is reading text information from a screen of the terminal, if the user has to temporarily leave the terminal or move his/her sight away from the screen, the reading process may be interrupted.

SUMMARY

According to aspects of the present disclosure, a method, an apparatus and a non-transitory computer-readable storage medium are provided for processing text information.

According to one aspect of the present disclosure, a method for processing text information is provided. The method may include determining that first text information is in a browsed state. When it is determined that the browsed state is interrupted, the method includes obtaining second text information from the first text information and converting the second text information to speech information and playing the speech information.

According to another aspect of the present disclosure, an apparatus for processing text information is provided. The device may include: a processor and a memory for storing instructions executable by the processor. The processor is configured to determine that first text information is in a browsed state. When it is determined that the browsed state is interrupted, the processor is configured to obtain second text information from the first text information; convert the second text information to speech information and play the speech information.

According to an additional aspect of the present disclosure, a non-transitory computer-readable storage medium is provided. The non-transitory computer-readable storage medium may store instructions. When the instructions are executed by a processor of a terminal, the terminal may be caused to determine that first text information is in a browsed state. When it is determined that the browsed state is interrupted, the processor is caused to obtain second text information from the first text information The processor is further configured to convert the second text information to speech information and playing the speech information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
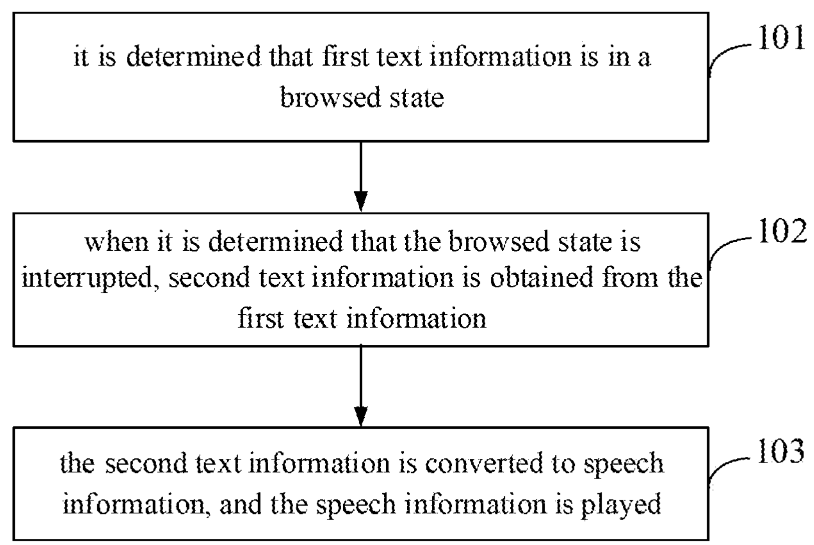
FIG. 1 is a flow chart illustrating a method for processing text information according to an aspect of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to show the purposes, technical solutions and advantages of the present disclosure, details of embodiments of the present disclosure will be illustrated with reference to accompanying drawings as follows.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent implementations consistent with the disclosure. Instead, they are merely examples of apparatuses and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

References throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment," "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

When a user is reading text information from a screen of a terminal, and the user leaves the terminal for a while or sight of the user is moved from the screen, the reading process may be interrupted.

With examples of the present disclosure, first text information is determined to be in a browsed state, second text information is obtained from the first text information when it is determined that the browsed state is interrupted, the second text information is converted to speech information, and the speech information is played.

Further, by automatically displaying the corresponding speech information when it is detected that the browsed state of the text information is interrupted, when the user leaves the terminal temporarily or turns his/her sight away from the screen of the terminal and has stopped text browsing, the user may hear the corresponding speech information played by the terminal. Thus, the text information is obtained continually and the user experience is improved.

FIG. 1 is a flow chart illustrating a method for processing text information according to an aspect of the present disclosure. As illustrated in FIG. 1, the method may be applied in a terminal and include following steps.

At block 101, it is determined that first text information is in a browsed state.

At block 102, when it is determined that the browsed state is interrupted, second text information is obtained from the first text information.

At block 103, the second text information is converted to speech information, and the speech information is played.

In this example, the first text information may be text information viewed by the user through the terminal. For example, the text information may be newspaper information, e-book information, office text information such as PDF or Word files, web page information, and the like. The present disclosure intends to cover detail attribute information of the text information such as the text format, the number of characters included, and the like, which is not elaborated herein.

In this example, the second text information may be included in the first text information. In detail, the second text information may be text information selected from the first text information according to certain rules. For example, the second text information may be a whole paragraph of the first text information where characters currently read by the user is located in or the second text information may be the whole first text information or part of the first text information that hasn't been read by the user.

In this example, the text information being in the browsed state is configured to indicate that the user is currently browsing the text information. For example, the user is reading and browsing web page information through a browser of a mobile phone.

In the present disclosure, the first text information is determined to be in the browsed state, the second text information is obtained from the first text information when it is determined that the browsed state is interrupted, the second text information is converted to the speech information, and the speech information is played. By automatically displaying the corresponding speech information when it is detected that the browsed state of the text information is interrupted, when the user leaves the terminal temporarily or turns his/her sight away from a screen of the terminal and the user may stop text browsing, the user may hear the corresponding speech information played by the terminal. Thus, the text information is obtained continually and the user experience is improved.

In a possible implementation of the present disclosure, determining that first text information is in a browsed state includes at least one of: determining that a screen of the terminal configured to display the first text information receives a preset touch instruction, and determining that a physical key or a virtual key of the terminal configured to display the first text information receives a preset operation instruction.

In an aspect, the preset touch instruction may be configured to indicate that the first text information is in the browsed state. For example, when the user is browsing text information through a mobile phone with a touch screen, the user may often control movements of texts by touching the touch screen during a reading process. For example, texts that are already read may be moved up, thus, a touch instruction is sent to the touch screen. Alternatively, the preset touch instruction may be that a frequency of touch operations received reaches to a preset value. For example, three touch operations are received in one minute. When the frequency reaches the preset value, it is considered that the text information is in a browsed state. Rules for setting the preset touch instruction may be determined by the user according to actual requirements, and there are no limits on these in the present disclosure.

For another example, when the user is reading through an e-book reader with keys (physical keys or virtual keys), the user may control contents of reading through the keys. For example, one of the keys may be a "last page" page turning key, and another key may be a "next page" page turning key, thus through control of the two keys, the user can control the page to be turned. Alternatively, the preset operation instruction may be at least one operation received by the physical key or the virtual key in a preset time period.

In the present disclosure, the first text information is determined to be in the browsed state when the preset touch instruction is received by the screen of the terminal or when the physical key or the virtual key of the terminal receives the preset operation instruction. Different ways for determining that the first text information is in the browsed state are provided, thereby enriching application scenarios, such that the method may be applied to different kinds of terminals, and flexibility of the method is increased.

In a possible implementation of the present disclosure, playing the speech information may include when detecting that an audio playing mode of the terminal configured to display the first text information is in an earphone mode, playing the speech information through an earphone coupled to the terminal; or when detecting that an audio playing mode of the terminal configured to display the first text information is in a speaker mode, playing the speech information through a speaker of the terminal.

In the present disclosure, via the above possible implementations, different audio playing modes are provided, thereby enriching the application scenarios, such that the method may be applied to different kinds of audio playing modes of the terminal, and the flexibility of the method is increased.

In a possible implementation of the present disclosure, when detecting that an audio playing mode of the terminal configured to display the first text information is in a speaker mode, the method may further include obtaining a distance from the terminal configured to display the first text information to a user, and adjusting a volume of the speaker according to the distance.

In this aspect, the user may be temporarily interrupted from reading and put the terminal in some place due to some interference. In this circumstance, for further improving listening effect of the user, it is provided in the aspect that the volume of the speaker may be adjusted according to the distance between the terminal and the user. Alternatively, the output volume of the speaker may be turned up as the distance increases, or turned down as the distance decreases. Or when the distance between the user and the terminal is more than a preset distance threshold, the output of the speaker is turned off. By that way, the user can hear the audio and the volume of the speaker may not be too loud.

In the present disclosure, the volume of the speaker is automatically adjusted according to the distance between the terminal and the user, thus manual adjustment of the volume is avoided, and the user may get the best listening effect via this way of playing the information through audio.

In a possible implementation of the present disclosure, when obtaining the second text information from the first text information, a text position being viewed (or a position of the text being viewed) in the first text information when the browsed state is interrupted may be determined and obtained, and text information following the text position being viewed in the first text information is determined as the second text information. Or, the first text information may be determined as the second text information.

In this implementation, via determining the viewed text position when the browsed state is interrupted, the speech may be controlled to play from the position where the interruption occurs. For example, the second text information determined according to the position where the interruption happens is the text information that hasn't been read. This implementation may keep the content consistent, and may save playing the resource by avoiding playing back the whole text information.

In addition, it is possible for determining the first text information as the second text information. For example, when the interruption happens, the first text information being read from the beginning, calculation may be simplified and resource of the processor may be saved, thus the execution and implementation may be easy and efficient.

In the present disclosure, the terminal may play from the beginning of the first text information or from the text position being viewed in the first text information when the browsed state is interrupted; thus the application scenarios are enriched.

In a possible implementation of the present disclosure, determining a text position being viewed in the first text information when the browsed state is interrupted includes detecting a focus position of the user's pupils on a screen of the terminal configured to display the first text information, and determining the focus position as the text position.

When people are reading text information, biologically the sight may be focused on the text currently being viewed, in this implementation, using the focus position of the user's pupils on the screen of the terminal when the browsed state is interrupted as the text position being viewed by the user may create a seamless transition of the text information the user reads and the speech information the user hears; thus avoiding the unnecessary repeat of speech for contents that have already been read.

In a possible implementation of the present disclosure, before determining the second text information from the first text information, the method may further include following actions.

When it is detected that a distance from the terminal configured to display the first text information to the user is greater than a first preset distance threshold, it is determined that the browsed state is determined to be interrupted.

Or, when it is detected that a preset instruction is received by a home appliance associated with the terminal configured to display the first text information, it is determined that the browsed state is determined to be interrupted.

Or in another case, when it is detected that a distance from the terminal configured to display the first text information to the user's pupils is greater than a second preset distance threshold, it is determined that the browsed state is determined to be interrupted.

In the present disclosure, the first preset distance threshold and the second preset distance threshold may be set according to requirements of the user, for example, one meter and other distance thresholds may be set according to the requirements of the user. The present disclosure does not limit to one or more particular limits.

In this aspect, the home appliance coupled to the terminal may be any home appliance, for example, in the case that the terminal is a mobile phone, the home appliance may be a smart door, a cooking device (e.g., a smart kettle), a washing machine and the like and present disclosure is not limited to one or more of the particular appliances. Receiving the preset instruction by the home appliance indicates that the browsed state of the user of the terminal is interrupted by an operation state of the home appliance. For example, the preset instruction may be a doorbell pressing instruction received by the smart door, and the user is likely to stop reading to open the door, or the preset instruction may be a prompt instruction from the kettle for prompting the user to turn off the gas, in this case, the user may stop reading to turn off the gas.

In the present disclosure, the interruption of the browsed state may be determined via the distance from the terminal to the user, an abnormal interference from the home appliance, or the distance from the terminal to the user's pupils; thus the application scenarios are enriched.

In a possible implementation of the present disclosure, the method may further include that, during playing of the speech information, when it is detected that the first text information is back to the browsed state, playing the speech information is stopped, and it prompts a text position corresponding to speech information being played in a preset period before the playing is terminated.

In this aspect, for detecting whether the text information is back to the browsed state, methods similar to the above ways for detecting whether the browsed state of the text information is interrupted may be used. For example, whether the text information is back to the browsed state may be determined by detecting if the distance between the user's pupils and the terminal is less than 0.5 meter. Moreover, it can also be determined by means such as detecting whether the screen receives a preset touch instruction. Other methods may also be used for detecting whether text information is back to the browsed state, which is not elaborated in the present disclosure.

In this aspect, the speech information being played in the preset period before the playing is terminated may be configured to indicate the recent content listened by the user. The preset period may be set according to requirements of the user, for example, the text position may be displayed for three seconds before the playing is terminated. Another preset period before the playing is terminated may be set which is not elaborated in the present disclosure.

In the present disclosure, during playing the speech information, when detecting that the first text information is back to the browsed state, the playing of the speech information may be stopped. Thus, the terminal may change from a playing mode to a previous reading mode. By doing so, user's reading requirement may be fulfilled and user loyalty may be increased. Also, the text position is prompted corresponding to the speech information being played in the preset period before the playing is terminated, the position that is played before stopping the playing is shown to the user. Thus it is convenient for the user to know where to continue reading.

The alternative technical solutions described above may be combined in any form to obtain alternative aspects of the present disclosure, which is elaborated here.

Figure 2:
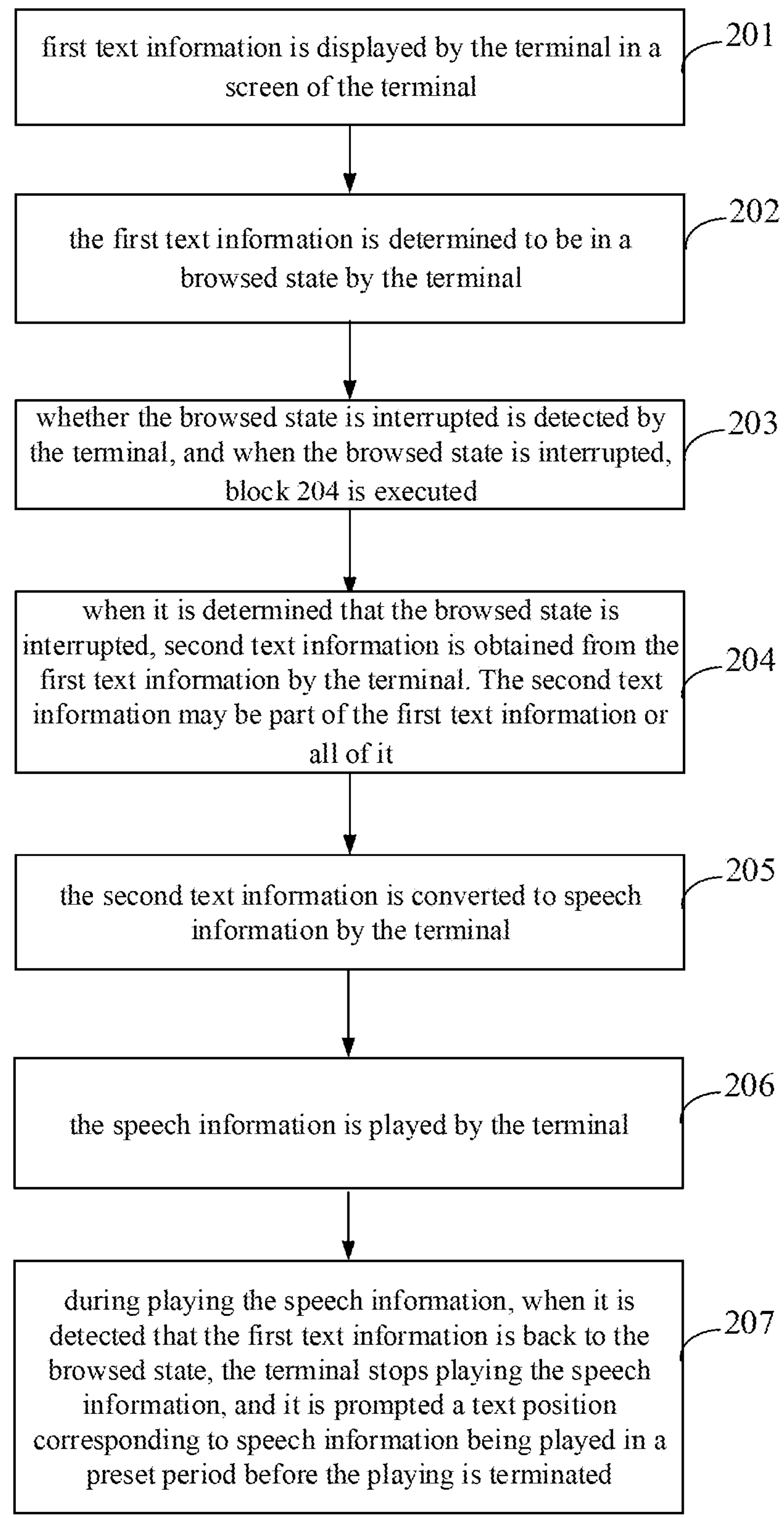
FIG. 2 is a flow chart illustrating another method for processing text information according to an aspect of the present disclosure.

FIG. 2 is a flow chart illustrating a method for processing text information according to an aspect of the present disclosure. The method can be applied in a terminal. As illustrated in FIG. 2, the method may include following steps.

At block 201, first text information is displayed by the terminal in a screen of the terminal.

When the user is reading text information through the terminal, the text information is displayed on the screen of the terminal by the terminal. In order to be distinguished from text information that is converted to and from speech information, the text information displayed on the screen is referred to as the first text information. The first text information may be web page contents, e-books, emails, or local documents, in which the local documents may include Word (text) documents, Excel (table) documents, and the like. In the present disclosure, the first text information is not limited to one or more certain types.

The terminal may be a mobile terminal, a portable Android device (PAD) terminal, a panel computer terminal, or a computer terminal. In the present disclosure, the terminal is not limited to one or more certain types.

Figure 3:
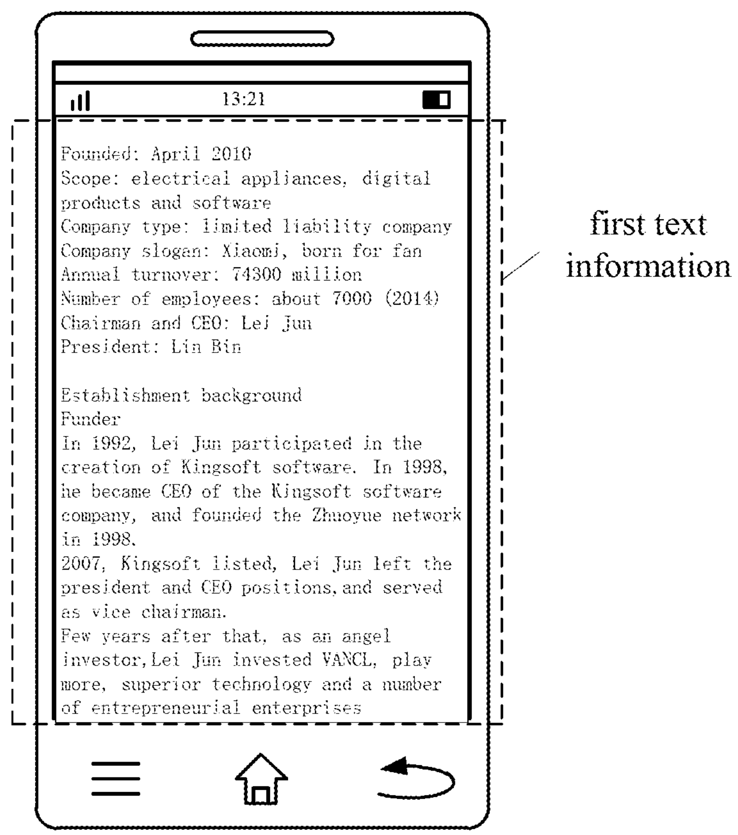
FIG. 3 is a schematic diagram illustrating an interface of displaying first text information according to an aspect of the present disclosure.

For example, as illustrated in FIG. 3, when the user searches for "Xiaomi" in a browser of the terminal, the terminal may obtain web page content related to "Xiaomi", then the web page content related to "Xiaomi" may be used as the first text information and displayed on the screen.

At block 202, the first text information is determined to be in a browsed state by the terminal.

In a possible scenario, when the first text information is browsed by the user, the user may perform touch actions to the screen. Thus, the block 202 may be performed as follows.

The terminal determines whether a preset touch instruction is received by the screen, and the terminal determines that the first text information is in the browsed state when the preset touch instruction is received; the terminal determines that the first text information is not in the browsed state when the preset touch instruction is not received. The preset touch instruction may a page up instruction or a page down instruction.

In a possible scenario, when the first text information is browsed by the user, the user may perform operation actions to a physical key or a virtual key of the terminal. Thus, the block 202 may be performed as follows.

The terminal determines whether a preset operation instruction is received by the physical key or the virtual key, and the terminal determines that the first text information is in the browsed state when the preset operation instruction is received by the physical key or the virtual key; the terminal determines that the first text information is not in the browsed state when the preset operation instruction is not received by the physical key or the virtual key. The preset operation instruction may a page up instruction or a page down instruction.

In a possible scenario, when the first text information is browsed by the user, the user's pupils may focus on the first text information. Thus, the block 202 may be performed as follows.

The terminal obtains a focus position of the user's pupils via an associated camera and determines whether the focus position is on the screen. When the focus position is on the screen, it is determined that the first text information is in the browsed state; when the focus position is not on the screen, it is determined that the first text information is not in the browsed state.

In a possible scenario, when the first text information is just opened by the user, the user may only want to glance over it and has no intention of reading the first text information carefully. In this case, playing the speech information may cause interference to the user. Thus, the block 202 may be performed as follows.

The terminal obtains a time length for which the first text information has been viewed. When the time length is longer than a preset time length, it is determined that the first text information is in the browsed state; when the time length is shorter than the preset time length, it is determined that the first text information is not in the browsed state.

The preset time length may be set and modified according to actual requirements. In the present disclosure, there are no limits on the preset time length. For example, the preset time length may be one minute or two minutes, and the like.

At block 203, whether the browsed state is interrupted or detected by the terminal, and when the browsed state is interrupted, block 204 is executed.

This block may be performed through the following three ways. In a first way, when the user is away from the terminal, the browsed state is determined to be interrupted by the terminal. Accordingly, the block may be performed as follows.

The terminal detects a distance between the user and the terminal. When detecting that the distance between the user and the terminal is greater than a first preset distance threshold, the terminal determines that the browsed state is interrupted; when detecting that the distance between the user and the terminal is less than the first preset distance threshold, the terminal determines that the browsed state is not interrupted.

The first preset distance threshold may be set and modified according to actual requirements. In the present disclosure, there are no limits on the first preset distance threshold. For example, the first preset distance threshold may be 80 centimeters or one meter, and the like.

Detecting the distance between the user and the terminal by the terminal may be performed as follows.

The terminal receives current position information of the user sent by a wearable device, and calculates the distance between the user and the terminal according to current position information of the terminal and the current position information of the user, in which, the wearable device is currently worn by the user.

Since the current position information sent by the wearable device may be the actual position information of the user only when the wearable device is worn by the user, before the current position information sent by the wearable device is received by the terminal, it should be determined by the terminal that whether the wearable device is currently worn by the user. When the wearable device is currently worn by the user, the terminal receives the current position information of the user sent by the wearable device; when the wearable device is not currently worn by the user, the process ends.

Determining whether the wearable device is currently worn by the user via the terminal may be performed as follows.

The terminal receives currently detected characteristic information sent by the wearing device, in which the characteristic information may include information such as heart rate and/or temperature. When the characteristic information is matched to the physical characteristics of the user, it is determined that the wearable device is currently worn by the user; when the characteristic information is not matched to the physical characteristics of the user, it is determined that the wearable device is not currently worn by the user. The wearable device may be a wrist strap terminal or a watch terminal.

When the characteristic information is a heart rate, the terminal determines whether the heart rate is within a human heart rate range. When the heart rate is within the human heart rate range, it is determined that the characteristic information and the user's physical characteristics are matched; when the heart rate is not within the human heart rate range, it is determined that the characteristic information and the user's physical characteristics are not matched. When the characteristic information is a temperature, the terminal determines whether the temperature is within a human temperature range. When the temperature is within the human temperature range, it is determined that the characteristic information and the user's physical characteristic are matched; when the temperature is not within the human temperature range, it is determined that the characteristic information and the user's physical characteristics are not matched.

In practice, the terminal and the wearable device may be coupled to each other through wireless communication modules. When the terminal and the wearable device are communicated to each other, a wireless transmission channel may be established by the wireless communication modules and communications are performed through the wireless transmission channel.

The wireless communication module may be a blue-tooth module, a Wireless Fidelity (Wi-Fi) module or a mobile network communication module. The mobile network communication module may be a third generation mobile communication technology (3G) communication module, a fourth generation mobile communication technology (4G) communication module or a fifth generation mobile communication technology (5G) communication module.

In a second way, prompt information from other terminals may be used by the terminal to detect whether the browsed state is interrupted. For example, when a doorbell of a smart door associated with the terminal suddenly rings, the smart door may send prompt information to the terminal, which prompts the user to open the door, and the browsed state is interrupted. Thus, this block 203 may be performed as follows.

When it is detected that a preset instruction is received by a home appliance associated with the terminal, the browsed state is determined to be interrupted.

The home appliance may include smart doors, smart washing machines or cooking devices, and the like. Accordingly, the preset instruction may be a door-open instruction, a taking-out-clothing instruction or a prompt instruction, and the like.

In a third way, when the terminal detects that the sight of the user is moved away from the screen, it determines that the browsed state is interrupted. Accordingly, this block may be performed as follows.

When it is detected that a distance from the terminal to the user's pupils is greater than a second preset distance threshold, the browsed state is determined to be interrupted by the terminal.

A distance sensor may be provided in the terminal, and the distance between the user's pupils and the terminal is detected by the distance sensor.

The second preset distance threshold may or may not be equal to the first preset distance threshold. The second preset distance threshold may also be set and modified according to the actual requirements. In the present disclosure, there are no limits on the second preset distance threshold. For example, the second preset distance threshold may be 50 centimeters or 80 centimeters, and the like.

At block 204, when it is determined that the browsed state is interrupted, second text information is obtained from the first text information by the terminal. The second text information may be part of the first text information or may include the whole first text information.

In this block, when the terminal starts to play the speech information from where the user happens to view in the first text information when the browsed state is interrupted, the action of requiring the second text information from the first text information may be performed as follows.

The terminal determines a position of the text being viewed in the first text information when the browsed state is interrupted, and the text information following the position of the viewed text in the first text information is determined as the second text information.

A focused position of the user's pupils on the screen may be obtained by the terminal via a camera, and the focused position may be determined as the viewed text position.

Figure 4:
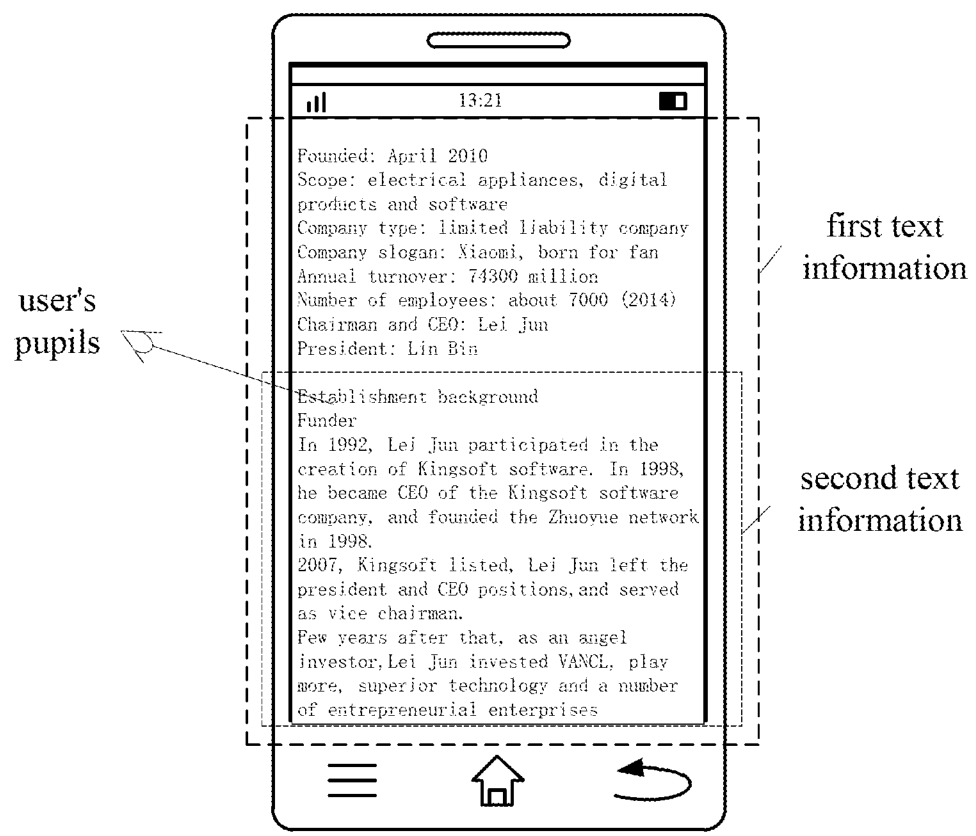
FIG. 4 is a schematic diagram illustrating an interface of determining second text information according to an aspect of the present disclosure.

For example, as illustrated in FIG. 4, the focused position of the user's pupils on the screen is obtained by the camera of the terminal. When the focused position corresponds to an "establishment background", the text position is determined at the text "establishment background", and the text information following an "establishment background" in the first text information may be determined as the second text information.

In this block, the terminal may also play the first text information from the very beginning. In this case, the first text information is directly determined as the second text information.

Figure 5:
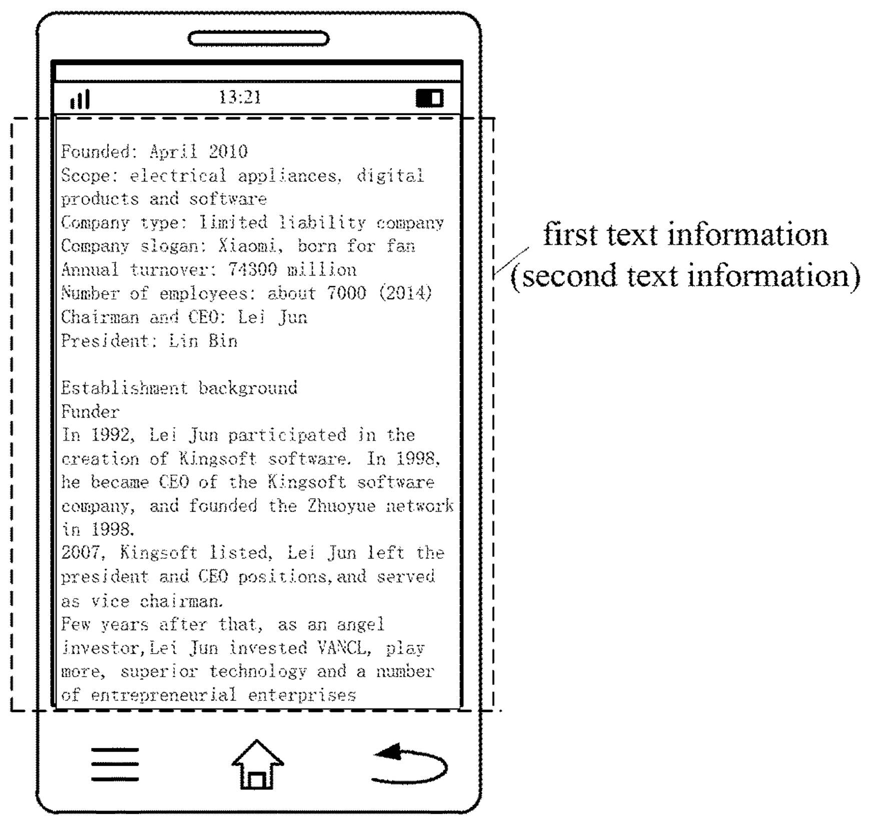
FIG. 5 is a schematic diagram illustrating another interface of determining second text information according to an aspect of the present disclosure.

For example, as illustrated in FIG. 5, the first text information may be determined as the second text information directly.

At block 205, the second text information is converted to speech information by the terminal.

The terminal may convert the second text information to the speech information by the terminal itself or through a server. When the terminal converts the second text information to the speech information by itself, and the second text information is web page contents, the terminal may obtain speech information corresponding to the first text information from the server while obtaining the first text information from the server. Then, the terminal obtains the speech information corresponding to the second text information from the speech information corresponding to the first text information obtained from the server. When the terminal converts the second text information to the speech information through the server, the terminal may send a converting request which carries the second text information to the server and receives the speech information corresponding to the second text information returned from the server.

At block 206, the speech information is played by the terminal.

For the terminal, audio playing modes may include an earphone mode and a speaker mode. Thus, the block may be performed as follows.

When detecting that the audio playing mode of the terminal is the earphone mode, the speech information is played through an earphone coupled to the terminal; or when detecting that the audio playing mode of the terminal is the speaker mode, the speech information is played through a speaker of the terminal.

When the terminal detects an earphone being coupled to the terminal, it is determined that the audio playing mode of the terminal is the earphone mode; when the terminal doesn't detect any earphone being coupled to the terminal, it is determined that the audio playing mode of the terminal is the speaker mode.

When the terminal plays the speech information through the speaker, a volume of the speaker may be adjusted according to a distance between the user and the terminal. Hence before displaying the speech information through the speaker, the terminal may perform following actions.

The terminal may obtain the distance between the terminal and the user, and the volume of the speaker is adjusted according to the distance.

The action of adjusting the volume of the speaker according to the distance may be performed as follows.

The terminal obtains a volume value corresponding to the distance, and the volume of the speaker of the terminal is adjusted to the volume value.

Corresponding relationships among the distances and the volumes may be stored in the terminal in advance. Accordingly, the action of obtaining the volume value corresponding to the distance may be performed as follows.

The terminal obtains the volume value corresponding to the distance from the pre-stored corresponding relationships among the distances and the volumes according to the distance.

Sometimes, the terminal may detect noise level around the terminal via a sensor. For the same distance from the user to the terminal, when the noise level is high, the volume of the speaker may be adjusted to a high level. However, when the noise level is low, the terminal may be in a quiet environment, and the volume of the speaker may be adjusted to be a low level.

In a possible scenario, although the audio playing mode of the terminal is the earphone mode, the user may take off the earphone and leave the terminal, that is, when the user does not wear the earphone, and the speech information played through the earphone cannot be heard by the user. Therefore, when detecting that the audio playing mode of the terminal is the earphone mode, the terminal may further detect whether the earphone is worn by the user. If the user wears the earphone, the speech information is played through the earphone. If the user doesn't wear the earphone, the speech information is played through the speaker.

The terminal may detect a temperature via a temperature sensor of the earphone, and determine whether the temperature is in a human body surface temperature range. When the temperature is in the human body surface temperature range, it is determined that the earphone is being worn by the user; when the temperature is beyond the human body surface temperature range, it is determined that the earphone is not being worn by the user.

The earphone may be coupled to the terminal via different ways, such as a wired way by which a connector of the earphone is inserted into an earphone port of the terminal so that the earphone is coupled to the terminal, or the earphone may be a blue tooth earphone, so that the earphone may be coupled to the terminal through a build-in blue tooth module which establishes a blue tooth connection to a blue tooth module in the terminal. With the two different connection ways, the action of playing the speech information through the earphone by the terminal may be performed as follows.

When the earphone is coupled to the terminal via the earphone port of the terminal, the terminal sends audio signals of the speech information to the earphone via the earphone port, so that the earphone can output the audio signals; or, when the earphone is coupled to the terminal via a blue-tooth, the terminal sends audio signals of the speech information to the earphone via the established blue tooth connection, so that the earphone can output the audio signals.

In an aspect, the terminal may play the speech information through the earphone and the speaker at the same time, and the block may be performed as follows.

The terminal may continually send the audio signals of the speech information to the earphone so as to make the earphone output the audio signals, meanwhile, the terminal may also send the audio signals of the speech information to the speaker so as to make the speaker output the audio signals as well.

For example, the second text information is the text information following "establishment background" in the first text information as shown in FIG. 5, and the terminal plays the speech information from "establishment background". For another example, the second text information is the first text information itself, and the terminal plays the speech information from the first character of a current display interface as shown in FIG. 5.

Sometimes, at the choice of the user, the output of the speech information may be stopped. For example, the terminal detects that the user is no longer reading the first information and starts to play the second information via a speaker of the terminal. However, the user may not want to listen to the second information at the moment and may choose to stop playing of the second information via the speaker of the terminal.

At block 207, during playing the speech information, when it is detected that the first text information is back to the browsed state, the terminal may stop playing the speech information, and it is prompted a text position corresponding to speech information being played in a preset period before the playing is terminated.

In order to show the text position corresponding to the speech being played and make it convenient for the user to know where to continue to read, when the terminal stop playing the speech information, it is labeled in the first text information the text position corresponding to the speech information being played in a preset period before the playing is terminated.

The way of labelling may include highlighting characters in the text position and adding bubbles on the text position. The preset period may be set and modified according to actual requirements. In aspects of the present disclosure, there are no limits on the preset period. For example, the preset period may be two seconds.

Sometimes, at the option of the user, the speech information may still be playing even though it is detected that the first text information is back to the browsed state. For example, the user may choose to listen to the speech while reading the first text information.

The terminal detects the distance between the user and the terminal, and it is determined that the first text information is back to the browsed state when detecting that the distance between the user and the terminal is within the first preset distance threshold.

Or, the terminal detects the distance between the user's pupils and the screen, and it is determined that the first text information is back to the browsed state when detecting that the distance between the user's pupils and the screen is within the second preset distance threshold.

In a possible scenario, although the distance between the user and the terminal is within the first preset distance threshold and/or the distance between the user's pupils and the screen is within the second preset distance threshold, the user's pupils are not focused on the first text information, thus the first text information is not back to the browsed state. In this case, before the terminal stop playing the speech information, the method may further include following actions.

The user's pupils are detected via the camera of the terminal. When it is detected that the user's pupils are focused on the first text information, the terminal stops playing the speech information, thus that first text information is returned to the reading mode, thereby avoiding disturbance caused by the playing speech information. However, when it is detected that the user's pupils are not focused on the first text information, the terminal continues playing the speech information.

In a possible implementation of the present disclosure, during the process of playing the speech information, when an indication for voice services is prompted, the terminal may stop playing the speech information. The indication for voice services may be an indication of an incoming call or a voice chat invitation.

In the present disclosure, the first text information is determined to be in the browsed state, the second text information is obtained from the first text information when it is determined that the browsed state is interrupted, the second text information is converted to the speech information, and the speech information is played. By automatically displaying the corresponding speech information when it is detected that the browsed state of the text information is interrupted, when the user leaves the terminal temporarily or turns his/her sight away from a screen of the terminal, such that he/she has to stop text browsing, he/she may hear the corresponding speech information played by the terminal, thereby obtaining the text information continually and improving the user experience.

An apparatus for processing text information is provided in the following aspect of the present disclosure. The apparatus may be configured to implement the above method for processing text information.

Figure 6:
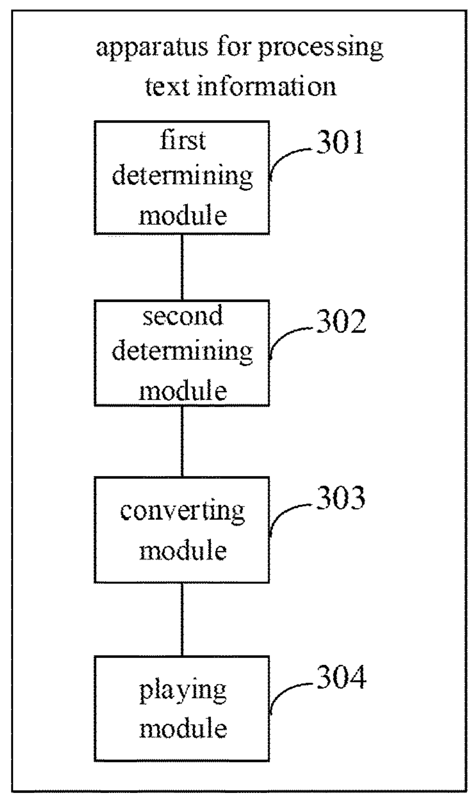
FIG. 6 is a block diagram illustrating an apparatus for processing text information according to an aspect of the present disclosure.

FIG. 6 is a block diagram illustrating an apparatus for processing text information according to an aspect of the present disclosure. Referring to FIG. 6, the apparatus includes a first determining module 301, a second determining module 302, a converting module 303 and a playing module 304.

The first determining module 301 may be configured to determine that first text information is in a browsed state.

The second determining module 302 may be configured to obtain second text information from the first text information when it is determined that the browsed state is interrupted.

The converting module 303 may be configured to convert the second text information to speech information.

The playing module 304 may be configured to play the speech information.

Figure 7:
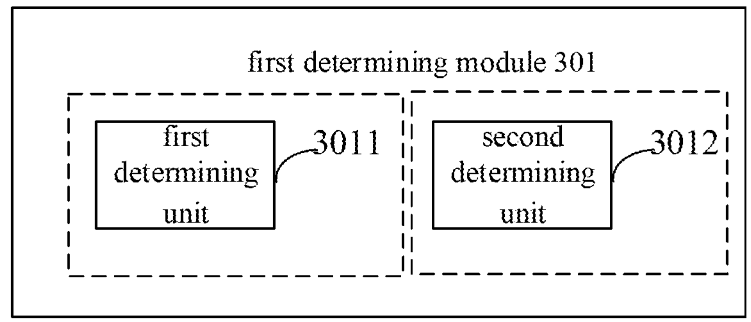
FIG. 7 is a block diagram illustrating a first determining module according to an aspect of the present disclosure.

In a possible implementation of the present disclosure, referring to FIG. 7, the first determining module 301 may include at least one of a first determining unit 3011 and a second determining unit 3012.

The first determining unit 3011 may be configured to determine that a screen of a terminal configured to display the first text information receives a preset touch instruction.

The second determining unit 3012 may be configured to determine that a physical key or a virtual key of a terminal configured to display the first text information receives a preset operation instruction.

Figure 8:
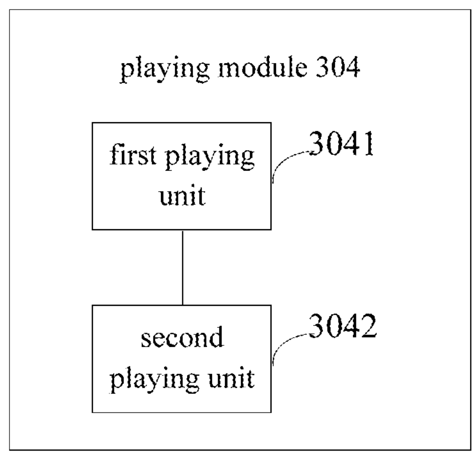
FIG. 8 is a block diagram illustrating a playing module according to an aspect of the present disclosure.

In a possible implementation of the present disclosure, referring to FIG. 8, the playing module 304 may include a first playing unit 3041 and a second playing unit 3042.

The first playing unit 3041 may be configured to play the speech information through an earphone coupled to the terminal when detecting that an audio playing mode of the terminal configured to display the first text information is an earphone mode.

The second playing unit 3042 may be configured to play the speech information through a speaker of the terminal when detecting that an audio playing mode of the terminal configured to display the first text information is a speaker mode.

In a possible implementation of the present disclosure, the second playing unit 3042 is further configured to obtain a distance from the terminal configured to display the first text information to the user, and adjust a volume of the speaker according to the distance.

Figure 9:
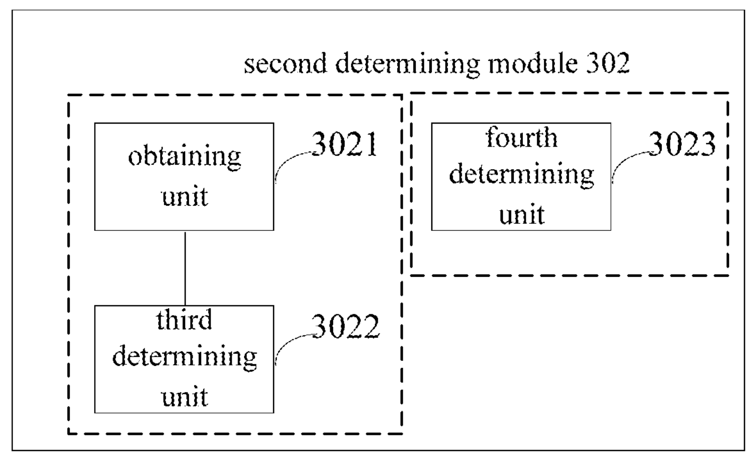
FIG. 9 is a block diagram illustrating a second determining module according to an aspect of the present disclosure.

In a possible implementation of the present disclosure, referring to FIG. 9, the second determining module 302 may include an obtaining unit 3021 and a third determining unit 3022.

The obtaining unit 3021 may be configured to determine a text position being viewed in the first text information when the browsed state is interrupted.

The third determining unit 3022 may be configured to determine text information following the text position being viewed in the first text information as the second text information.

Or, the second determining module 302 may include a fourth determining unit 3023 which may be configured to determine the first text information as the second text information.

Figure 10:
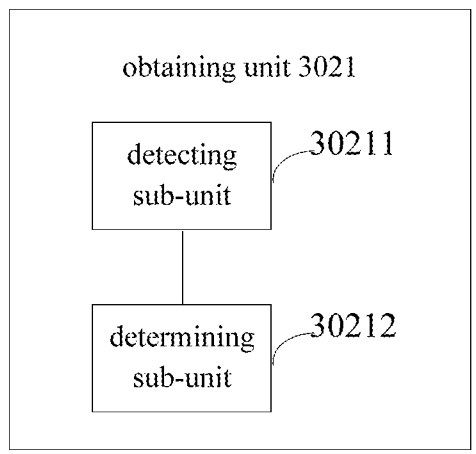
FIG. 10 is a block diagram illustrating an obtaining unit according to an aspect of the present disclosure.

In a possible implementation of the present disclosure, referring to FIG. 10, the obtaining unit 3021 may include a detecting sub-unit 30211 and a determining sub-unit 30212.

The detecting sub-unit 30211 may be configured to detect a focus position of user's pupils on a screen of the terminal configured to display the first text information.

The determining sub-unit 30212 may be configured to determine the focus position as the text position.

Figure 11:
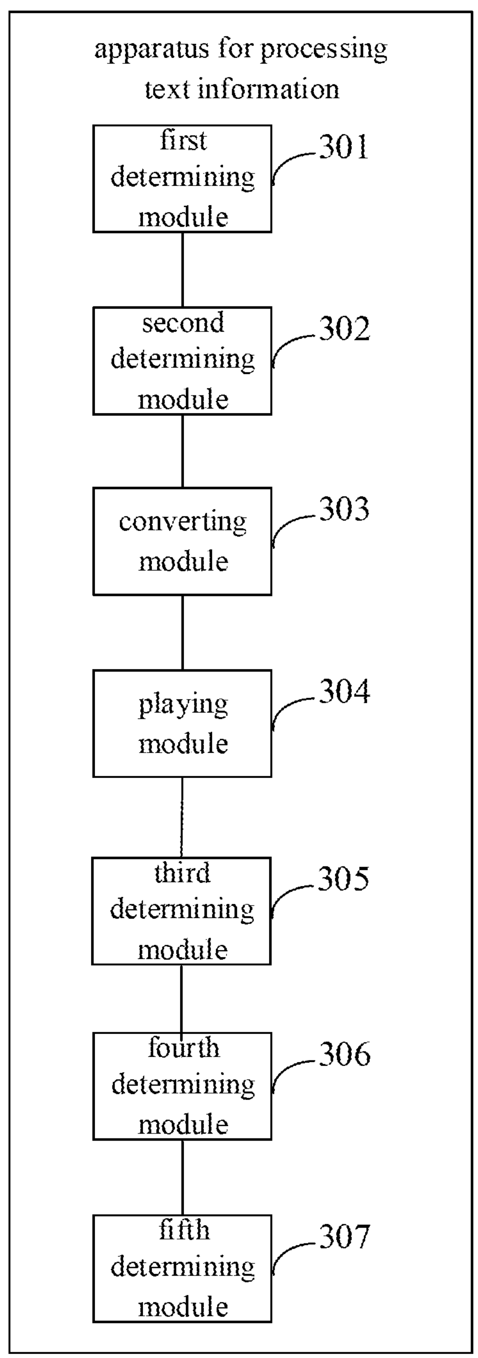
FIG. 11 is a block diagram illustrating another apparatus for processing text information according to an aspect of the present disclosure.

In a possible implementation of the present disclosure, With reference to FIG. 11, the apparatus may further include a third determining module 305, or a fourth determining module 306, or a fifth determining module 307.

The third determining module 305 may be configured to determine that the browsed state is interrupted when it is detected that a distance from the terminal configured to display the first text information to the user is greater than a first preset distance threshold.

The fourth determining module 306 may be configured to determine that the browsed state is interrupted when it is detected that a preset instruction is received by a home appliance associated with the terminal configured to display the first text information.

The fifth determining module 307 may be configured to determine that the browsed state is interrupted, when it is detected that a distance from the terminal configured to display the first text information to user's pupils is greater than a second preset distance threshold.

Figure 12:
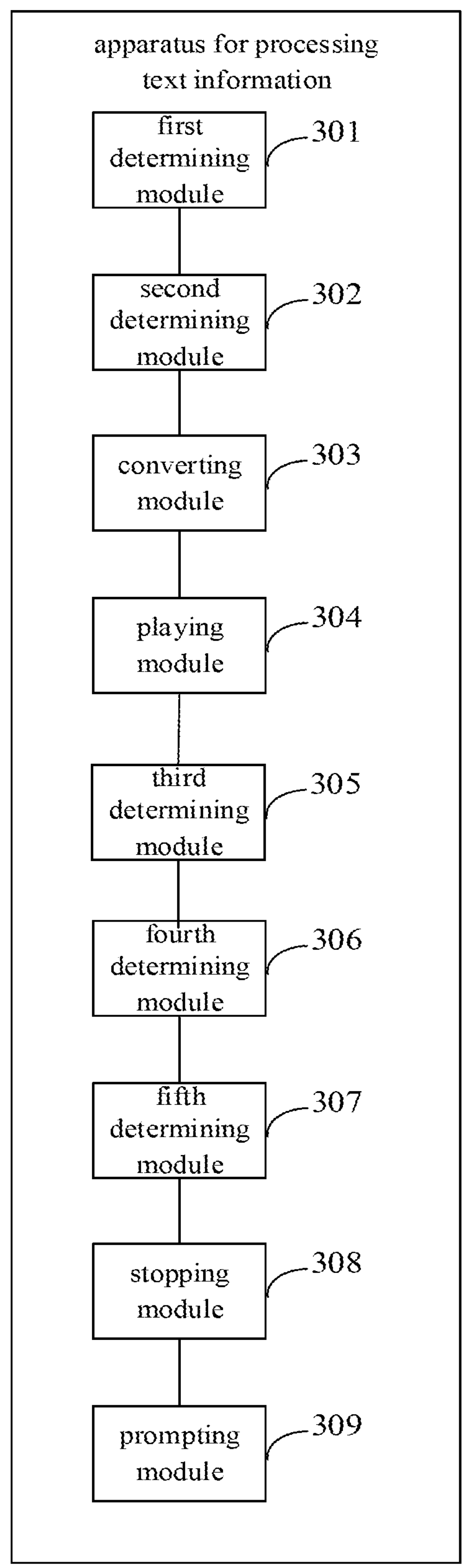
FIG. 12 is a block diagram illustrating yet another apparatus for processing text information according to an aspect of the present disclosure.

In a possible implementation of the present disclosure, With reference to FIG. 12, the apparatus may further include a stopping module 308 and a prompting module 309.

The stopping module 308 may be configured to stop playing the speech information when it is detected that the first text information is back to the browsed state during playing the speech information.

The prompting module 309 may be configured to prompt a text position corresponding to speech information being played in a preset period before the playing is terminated.

In the present disclosure, the first text information is determined to be in the browsed state via the first determining module 301, the second text information is obtained from the first text information via the second determining module 302 when it is determined that the browsed state is interrupted, the second text information is converted to the speech information via the converting module 303, and the speech information is played via the playing module 304. By automatically displaying the corresponding speech information when it is detected that the browsed state of the text information is interrupted, when the user leaves the terminal temporarily or turns his/her sight away from a screen of the terminal, such that he/she has to stop text browsing, he/she may hear the corresponding speech information played by the terminal, thereby obtaining the text information continually and improving the user experience.

The alternative technical solutions described above may be combined in any form to obtain alternative aspects of the present disclosure, which will not be elaborated here.

It should be noted that when text information is processed by the apparatus for processing text information provided in the above aspects, divisions of the functional modules are just for explanation and illustration. In practice, the above functions may also be achieved by different functional modules according to requirements, that is, the apparatus may be divided into different functional modules while being able to accomplish part or all of the above functions at the same time. In addition, the apparatus for processing text information provided in the above aspects may share similar principles with the method for processing text information, details of which may be found in the method examples, and thus will not be elaborated here.

It also provides a device for processing text information according to aspects of the present disclosure, which includes a processor; a memory for storing instructions executable by the processor; in which, the processor is configured to: determine that first text information is in a browsed state; obtain second text information from the first text information when it is determined that the browsed state is interrupted; convert the second text information to speech information, and play the speech information.

Figure 13:
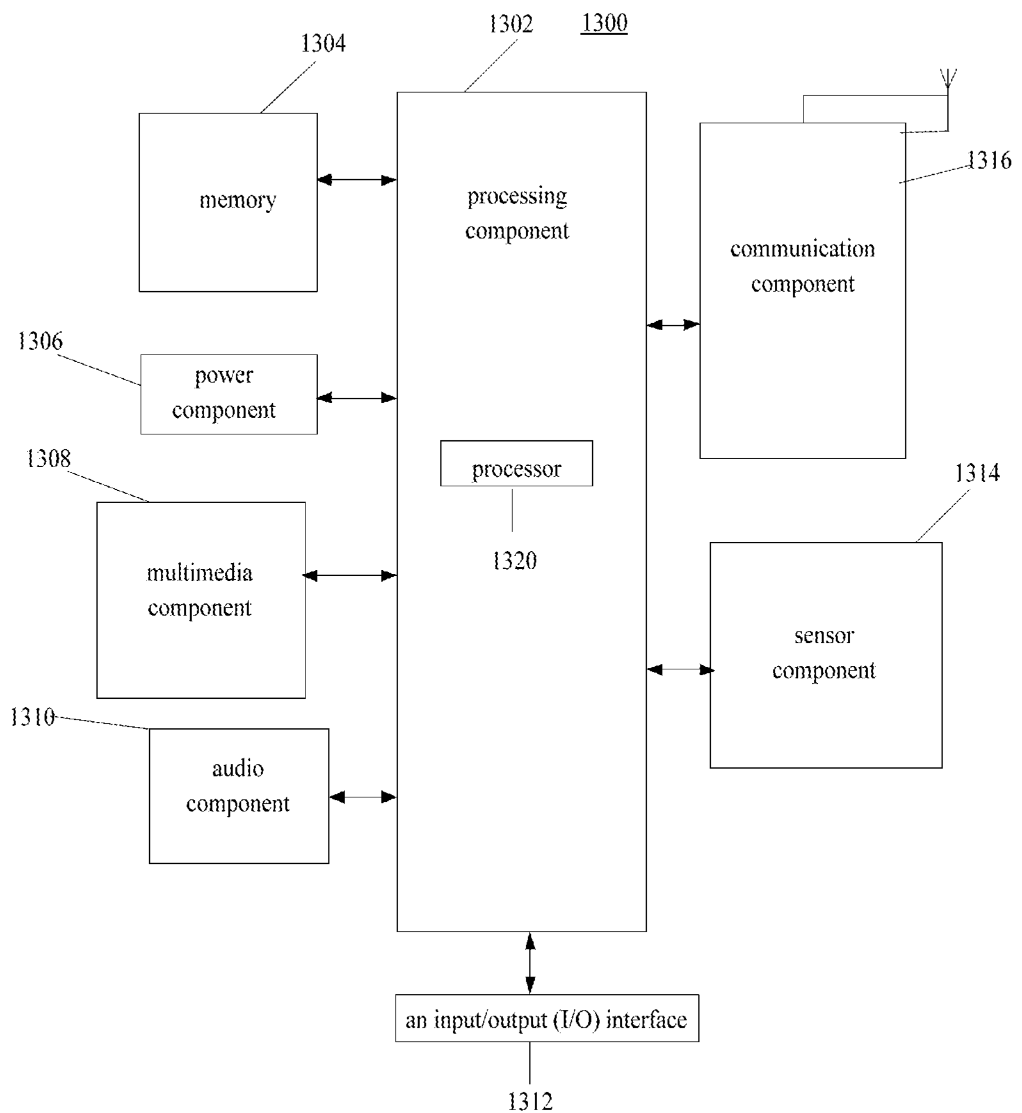
FIG. 13 is a block diagram illustrating a device for processing text information according to an aspect of the present disclosure.

FIG. 13 is a block diagram showing a device for processing text information 1300 according to an exemplary example. For example, device 1300 could be a mobile phone, a computer, a digital broadcast terminal, a messaging device, a gaming console, a tablet, a medical device, an exercise equipment, a personal digital assistant, and the like.

With reference to FIG. 13, device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above-described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 may be configured to store various types of data to support the operation of the device 1300. Examples of such data include instructions for any applications or methods operated on the device 1300, contact data, phonebook data, messages, pictures, videos, and the like. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 may be configured to output and/or input audio signals. For example, the audio component 1310 includes a microphone (MIC) configured to receive an external audio signal when the device 1300 is in an operation mode, such as a call mode, a recording mode, and a voice recognition mode. The received audio signal may be further stored in the memory 1304 or transmitted via the communication component 1316. In some aspects, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby items without any physical contact. The sensor component 1314 may also include a light sensor, such as a CMOS or CCD image sensor, for use in imaging applications. In some aspects, the sensor component 1314 may also include an accelerometer sensor, a gyroscope sensor, a magnetic sensor, a pressure sensor, or a temperature sensor.

The communication component 1316 may be configured to facilitate communication, wired or wirelessly, between the device 1300 and other devices. The device 1300 can access a wireless network based on a communication standard, such as WIFI, 2G, or 3G, or a combination thereof. In one exemplary example, the communication component 1316 receives a broadcast signal or broadcast associated information from an external broadcast management system via a broadcast channel. In one exemplary example, the communication component 1316 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary examples, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for processing text information.

In exemplary examples, there is also provided a non-transitory computer readable storage medium including instructions, such as the memory 1304 including instructions, the above instructions are executable by the processor 1320 in the device 1300, for performing the above-described methods for processing text information. For example, the non-transitory computer-readable storage medium may be a ROM, a RAM, a CD-ROM, a magnetic tape, a floppy disc, an optical data storage device, and the like.

With the computer readable non-transitory storage medium, when instructions stored in the storage medium are executed by a processor of the apparatus, the apparatus is caused to perform the above method for processing text information, and the method includes: determining that first text information is in a browsed state; when it is determined that the browsed state is interrupted, obtaining second text information from the first text information; converting the second text information to speech information, and playing the speech information.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other aspects of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for processing text information, comprising:

determining that first text information is in a browsed state;

determining that the browsed state is interrupted when it is detected that a preset instruction is received by a home appliance associated with a terminal configured to display the first text information;

when it is determined that the browsed state is interrupted, obtaining second text information from the first text information;

converting the second text information to speech information and playing the speech information, wherein the preset instruction causes a user to leave the terminal configured to display the first text information temporarily, such that the browsed state of the terminal is interrupted, and wherein it is determined that the browsed state is interrupted when it is detected that a distance from the terminal configured to display the first text information to the user is greater than a first preset distance threshold, and the distance from the terminal is calculated between the user and the terminal according to position information of the terminal and the user and the first preset distance threshold is set according to a user requirement.

2. The method according to claim 1, wherein, determining that first text information is in a browsed state comprises at least one of:

determining that a screen of the terminal configured to display the first text information receives a preset touch instruction; and determining that a physical key or a virtual key of the terminal configured to display the first text information receives a preset operation instruction.

3. The method according to claim 1, wherein, playing the speech information comprises:

when detecting that an audio playing mode of the terminal configured to display the first text information is an earphone mode, playing the speech information through an earphone coupled to the terminal; or when detecting that an audio playing mode of the terminal configured to display the first text information is a speaker mode, playing the speech information through a speaker of the terminal.

4. The method according to claim 3, wherein, when detecting that an audio playing mode of the terminal configured to display the first text information is a speaker mode, the method further comprises:

obtaining the distance from the terminal configured to display the first text information to the user; and adjusting a volume of the speaker according to the distance from the terminal configured to display the first text information to the user.

5. The method according to claim 1, wherein, obtaining second text information from the first text information comprises:

determining a text position being viewed in the first text information when the browsed state is interrupted, and determining text information following the text position being viewed in the first text information as the second text information; or determining the first text information as the second text information.

6. The method according to claim 5, wherein, determining the text position being viewed in the first text information when the browsed state is interrupted comprises:

detecting a focus position of user's pupils on a screen of the terminal configured to display the first text information; and determining the focus position as the text position being viewed.

7. The method according to claim 1, further comprising:

during playing the speech information, when it is detected that the first text information is back to the browsed state, stopping playing the speech information and prompting a text position corresponding to speech information being played in a preset period before the playing is terminated.

8. A device for processing text information, comprising:

one or more processors;

tangible, non-transitory computer-readable memory for storing instructions executable by the one or more processors to cause the device to perform:

determine that first text information is in a browsed state;

determining that the browsed state is interrupted when it is detected that a preset instruction is received by a home appliance associated with a terminal configured to display the first text information;

when it is determined that the browsed state is interrupted, obtain second text information from the first text information;

convert the second text information to speech information and play the speech information, wherein the preset instruction causes a user to leave the terminal configured to display the first text information temporarily, such that the browsed state of the terminal is interrupted, and wherein it is determined that the browsed state is interrupted when it is detected that a distance from the terminal configured to display the first text information to the user is greater than a first preset distance threshold, and the distance from the terminal is calculated between the user and the terminal according to position information of the terminal and the user and the first preset distance threshold is set according to a user requirement.

9. The device according to claim 8, wherein the one or more processors are configured to determine that first text information is in a browsed state by at least one of:

determining that a screen of the terminal configured to display the first text information receives a preset touch instruction; and determining that a physical key or a virtual key of the terminal configured to display the first text information receives a preset operation instruction.

10. The device according to claim 8, wherein the one or more processors are configured to play the speech information by actions of:

when detecting that an audio playing mode of the terminal configured to display the first text information is an earphone mode, playing the speech information through an earphone coupled to the terminal; or when detecting that an audio playing mode of the terminal configured to display the first text information is a speaker mode, playing the speech information through a speaker of the terminal.

11. The device according to claim 10, wherein the one or more processors are configured to detect that an audio playing mode of the terminal configured to display the first text information is a speaker mode by actions of:

obtaining the distance from the terminal configured to display the first text information to the user; and adjusting a volume of the speaker according to the distance from the terminal configured to display the first text information to the user.

12. The device according to claim 8, wherein the one or more processors are configured to obtain second text information from the first text information by actions of:

determining a text position being viewed in the first text information when the browsed state is interrupted, and determining text information following the text position being viewed in the first text information as the second text information; or determining the first text information as the second text information.

13. The device according to claim 12, wherein the one or more processors are configured to determine a text position being viewed in the first text information when the browsed state is interrupted by actions of:

detecting a focus position of user's pupils on a screen of the terminal configured to display the first text information; and determining the focus position as the text position being viewed.

14. The device according to claim 8, wherein the one or more processors are configured to:

during playing the speech information, when it is detected that the first text information is back to the browsed state, stop playing the speech information and prompt a text position corresponding to speech information being played in a preset period before the playing is terminated.

15. A tangible non-transitory computer-readable storage medium having stored therein instructions that, when executed by a processor of a terminal, causes the terminal to perform a method for processing text information, the method comprising:

determining that first text information is in a browsed state;

determining that the browsed state is interrupted when it is detected that a preset instruction is received by a home appliance associated with the terminal, wherein the terminal is configured to display the first text information;

when it is determined that the browsed state is interrupted, obtaining second text information from the first text information;

converting the second text information to speech information and playing the speech information, wherein the preset instruction causes a user to leave the terminal configured to display the first text information temporarily, such that the browsed state of the terminal is interrupted, and wherein it is determined that the browsed state is interrupted when it is detected that a distance from the terminal configured to display the first text information to the user is greater than a first preset distance threshold, and the distance from the terminal is calculated between the user and the terminal according to position information of the terminal and the user and the first preset distance threshold is set according to a user requirement.

16. The tangible, non-transitory computer-readable storage medium according to claim 15, wherein, determining that first text information is in a browsed state comprises at least one of:

determining that a screen of the terminal configured to display the first text information receives a preset touch instruction; and determining that a physical key or a virtual key of the terminal configured to display the first text information receives a preset operation instruction.

17. The tangible, non-transitory computer-readable storage medium according to claim 15, wherein, playing the speech information comprises:

when detecting that an audio playing mode of the terminal configured to display the first text information is an earphone mode, playing the speech information through an earphone coupled to the terminal; or when detecting that an audio playing mode of the terminal configured to display the first text information is a speaker mode, playing the speech information through a speaker of the terminal.

18. The tangible, non-transitory computer-readable storage medium according to claim 17, wherein, when detecting that an audio playing mode of the terminal configured to display the first text information is a speaker mode, the method further comprises:

obtaining the distance from the terminal configured to display the first text information to the; and adjusting a volume of the speaker according to the distance from the terminal configured to display the first text information to the user.

19. The method according to claim 1, wherein receiving the preset instruction by the home appliance indicates that the browsed state of the terminal is interrupted by an operation state of the home appliance.

20. The device according to claim 8, wherein receiving the preset instruction by the home appliance indicates that the browsed state of the terminal is interrupted by an operation state of the home appliance.

* * * * *